United States Patent [19]

Fontanilla

[11] Patent Number: 5,736,211
[45] Date of Patent: Apr. 7, 1998

[54] BUTT STRIP TAPE FOR INSULATION APPLICATION

[75] Inventor: Dennis G. Fontanilla, East Hanover, N.J.

[73] Assignee: Compac Corporation, Netcong, N.J.

[21] Appl. No.: 612,778

[22] Filed: Mar. 8, 1996

Related U.S. Application Data

[63] Continuation of Ser. No. 416,519, Apr. 4, 1995, abandoned, which is a continuation of Ser. No. 217,154, Mar. 24, 1994, abandoned.

[51] Int. Cl.$^6$ .................................................. B32B 7/10
[52] U.S. Cl. .................... 428/40.1; 138/140; 138/151; 428/36.9; 428/36.91; 428/41.7; 428/41.8; 428/41.9; 428/42.2; 428/42.3; 428/43; 428/57; 428/58; 428/194; 428/201; 428/202; 428/212; 428/213; 428/474.4; 428/480; 428/500; 428/522
[58] Field of Search .................. 428/36.9, 36.91, 428/40.1, 41.7, 41.8, 41.9, 42.2, 42.3, 194, 57, 58, 201, 202, 212, 213, 354, 474.4, 480, 500, 522; 138/140, 151

[56] References Cited

U.S. PATENT DOCUMENTS

| | | | |
|---|---|---|---|
| 2,561,362 | 7/1951 | Guillot | 428/331 |
| 2,797,731 | 7/1957 | Carlson, Jr. | 156/187 |
| 3,497,383 | 2/1970 | Olyphant et al. | 428/209 |
| 3,770,556 | 11/1973 | Evans et al. | 428/77 |
| 3,876,454 | 4/1975 | Snell et al. | 428/336 |
| 3,941,159 | 3/1976 | Toll | 428/81 |
| 3,957,724 | 5/1976 | Schurb et al. | 428/447 |
| 3,993,833 | 11/1976 | Esmay | 428/311 |
| 4,022,248 | 5/1977 | Hepner et al. | 138/141 |
| 4,028,474 | 6/1977 | Martin | 428/40 |
| 4,060,664 | 11/1977 | McGuire et al. | 428/336 |
| 4,181,765 | 1/1980 | Harmony | 428/157 |
| 4,242,453 | 12/1980 | Umezawa et al. | 435/123 |
| 4,287,013 | 9/1981 | Ronning | 156/242 |
| 4,389,270 | 6/1983 | McClintock | 156/218 |
| 4,503,114 | 3/1985 | Cohen | 428/247 |
| 4,513,039 | 4/1985 | Esmay | 428/40 |
| 4,522,870 | 6/1985 | Esmay | 428/252 |
| 4,584,217 | 4/1986 | McClintock | 428/40 |
| 4,595,615 | 6/1986 | Cohen | 428/36 |
| 4,605,043 | 8/1986 | Grenier | 138/149 |
| 4,606,957 | 8/1986 | Cohen | 428/40 |
| 4,728,571 | 3/1988 | Clemens et al. | 428/352 |
| 4,755,410 | 7/1988 | Cohen | 428/58 |
| 4,780,347 | 10/1988 | Cohen | 428/36 |
| 4,842,908 | 6/1989 | Cohen et al. | 428/34.2 |
| 4,946,732 | 8/1990 | Cohen et al. | 428/192 |
| 5,049,445 | 9/1991 | Arvidsson | 428/41.9 |
| 5,141,793 | 8/1992 | Fontanilla | 428/42 |
| 5,212,002 | 5/1993 | Madzak | 428/41.9 |

*Primary Examiner*—Nasser Ahmad
*Attorney, Agent, or Firm*—Edgar A. Zarins; Malcolm L. Sutherland

[57] ABSTRACT

A pressure sensitive tape for sealing butted edges of an insulation jacket applied to pipes and the like. The tape includes high-performance acrylic pressure sensitive adhesive which adheres at both low and elevated temperatures and a film adhesion layer on the tape to allow final closure at the job site. As the tape is wrapped around the insulation jacket, the adhesive adheres to the film layer on the upper side of the tape to provide permanent adherence.

9 Claims, 1 Drawing Sheet

5,736,211

BUTT STRIP TAPE FOR INSULATION APPLICATION

This application is a continuation of application Ser. No. 08/416,519 filed on Apr. 4, 1995, now abandoned, which is a continuation of application Ser. No. 08/217,154 filed on Mar. 24, 1994, now abandoned.

BACKGROUND OF THE INVENTION

I. Field of the Invention

This invention relates to a pressure sensitive tape for sealing the gap between sections of insulation and, in particular, to a tape which incorporates a plastic polymer film at one end to form a bonding surface to facilitate attachment of the other end of the tape to seal the butt joint of the insulation joint.

II. Description of the Prior Art

Insulation has become increasingly important to prevent the loss of heat or to protect pipes from cold environments. Specially constructed insulation jackets are applied to the pipe to prevent the transfer of heat. The insulation jackets typically include two halves which are wrapped around the pipe. The longitudinal gap is sealed using either a separate tape or an overlapping flap formed as an extension of the kraft outer layer of the jacket. The insulation jackets are provided in predetermined lengths and therefore a plurality of the jackets are applied in longitudinally abutting relationship. For maximum insulation, the butt gap between the sections of insulation must be sealed. In most applications, the gap is sealed using a butt strip tape which wraps around the insulation jacket and adheres to itself as well as the insulation.

The tapes utilized to seal gaps within the insulation are similar to the wrapping of the insulation jackets which forms a vapor barrier for the insulation. The body of the tape typically comprises an outer flame retardant kraft paper layer, a middle laminating layer of fiberglass yarn and an inner metallized layer such as aluminum foil. A pressure sensitive adhesive is applied to the inner surface of the tape and a release liner is provided in order to protect the adhesive until application. In the earliest versions of the butt strip tape, the tape was simply wrapped and adhered to itself, the adhesive sticking to the outer paper layer. However, it has been found that a secure bond is not always created between the adhesive and a paper causing the butt strip tape to open exposing the gap.

As a means to improve the adhesion of the butt strip tape, a cured adhesive strip has been provided along one end of the tape. This non-tacky, moisture resistant strip is applied across the width of the tape proximate one end. However, this coating must be applied at the factory requiring that the tape strips be cut to length prior to shipment. As a result, specific lengths must be manufactured for specific applications to known insulation circumferences. The addition of the coating layer provides limited benefit in field applications while adding to the cost of manufacturing.

SUMMARY OF THE PRESENT INVENTION

The present invention overcomes the disadvantages of the prior known adhesive tapes for sealing the gap between abutting segments of insulation by providing a plastic film adhereable to the outer side of the tape for improved sealing of the tape on top of itself.

The pressure sensitive adhesive tape is provided in strips having a width sufficient to cover the gap between abutting segments of cylindrical insulation jackets for a pipe. The butt strip tape is wrapped circumferentially around the insulation to seal the gap. The tape is cut at a length to allow a second end of the tape to wrap over a portion of the first end of the tape. The tape is constructed of a kraft paper at its outer surface, a laminate including fiberglass yarn and a metal foil as its inner layer. A pressure sensitive adhesive is applied to the inner surface which is protected by a release liner.

An adhesion surface is created by applying a plastic polymer film to the first end of the tape. The polymer film preferably has a thickness of 0.0001 inch to 0.005 inch and may include polyester, polyethylene, polypropylene, nylon, acetate, polyvinyl chloride, or polystyrene. A pressure sensitive adhesive is used to adhere the film to the outer side of the tape formed by the kraft paper. Once the desired length of tape is cut in the field, a segment of polymer film can be applied to the first end of the tape. As the butt strip tape is wrapped around the insulation, the pressure sensitive adhesive of the tape will adhere to the exterior of the insulation jacket. In addition, the pressure sensitive adhesive of the second end of the tape is placed into contact with the polymer film on the first end of the tape which provides a permanent adhesion surface thereby ensuring sealing of the gap between the insulation segments.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
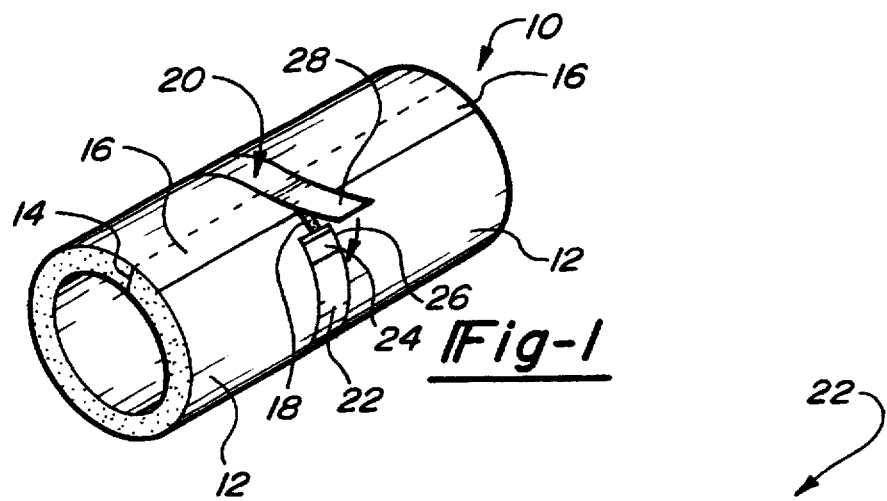
FIG. 1 is a perspective view of an insulation jacket applied to a pipe and incorporating the butt-strip tape embodying the present invention.

Referring first to FIG. 1, there is shown an insulation system 10 for insulating a tubular member (not shown) such as a pipe against heat loss or cold. The insulation system 10 includes abutting insulation jackets 12 which are wrapped around the pipe and sealed along their longitudinal seam 14 by an overlapping flap 16 extending from one side of the insulation jacket 12. The insulation segments 12 are mounted onto the pipe in abutting relationship forming a circumferential seam or gap 18. In order to seal the seam 18, a pressure sensitive adhesive tape 20 is wrapped circumferentially around the insulation 12 along the seam 18.

Figure 2:
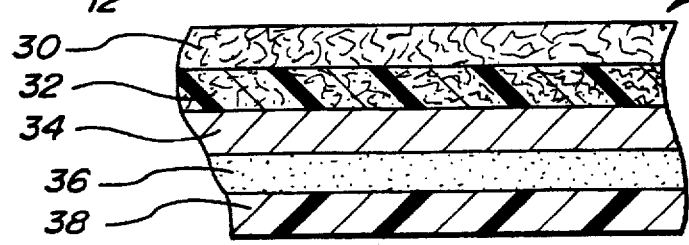
FIG. 2 is a cross-sectional view of the pressure sensitive adhesive tape.
Figure 3:
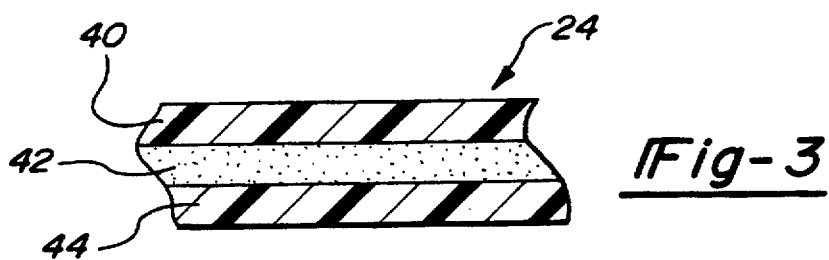
FIG. 3 is a cross-sectional view of the plastic film for the pressure sensitive adhesive tape.
Figure 4:
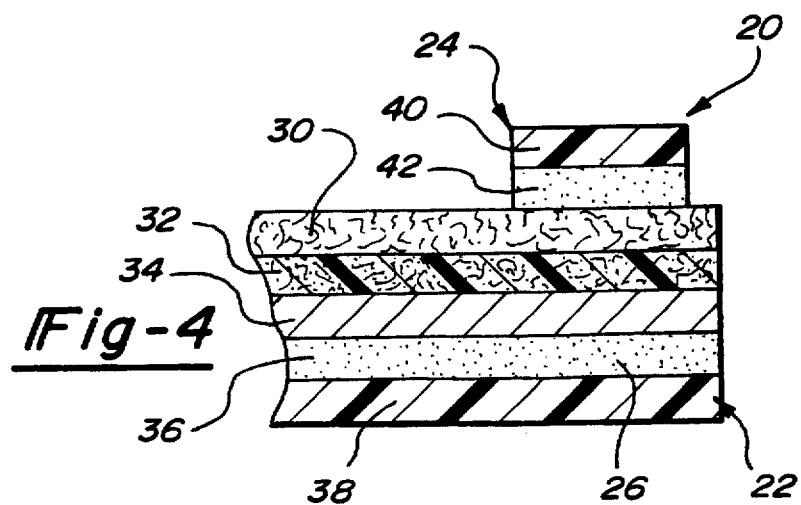
FIG. 4 is a cross-sectional view of the butt strip tape with the plastic film attached thereto.

Referring now to FIGS. 2 through 4, the major components and the assembled butt strip tape 20 are depicted in cross-section to provide a clear illustration of the layers comprising the tape. It is to be understood that these drawings merely show the relationship of the various layers of the tape 20 with the relative thicknesses of the layers variable in accordance with the properties of the tape 20. FIG. 2 shows a cross-section of the tape body 22 which comprises the majority of the tape assembly 20. FIG. 3 is a cross-sectional view of the plastic polymer film laminate 24 which is applied to a first end 26 of the tape body 22 to provide an adhesion surface for a second end 28 of the tape body 22.

The tape body preferably includes five layers as shown in FIG. 2. The outermost layer 30 is preferably a kraft paper layer. Alternatively, the outer layer 30 may be a plastic film such as polyester, polypropylene, polyvinyl chloride acetate, nylon or polyethylene, a metallized plastic film, or an aluminum foil. Affixed to an inner surface of the kraft paper layer 30 is a fiberglass yarn layer 32 imbedded in a laminating adhesive. This adhesive/fiberglass yarn layer 32 adds structural strength to the tape body 22 while providing a means of adhering an aluminum foil layer 34 to the kraft paper layer 30. The laminating adhesive used with the fiberglass yarn may include an acrylic, polychloroprene, vinyl acetate, polyvinyl chloride, rubber or silicates. Alternatives to the aluminum foil 34 include plastic film or a metallized plastic film.

In order to attach the tape 20 to the insulation 12, a layer of pressure sensitive adhesive 36 is applied to the underside of tape body 22. The adhesive layer 36 covers the entire underside of the tape to maximize the adhesive area for adhesion across the seam 18. The pressure sensitive adhesive 36 may be an acrylic, vinyl acetate copolymer, natural or synthetic rubber based adhesive. A release liner 38 is provided to protect the adhesive layer 36 until application of the tape 20 to the insulation 12.

The plastic film 24 is attachable to the tape body 22 to provide a surface to secure the butt strip tape 20. The plastic film 24 includes an outer layer of plastic film 40 having a thickness of between 0.0001 inch to 0.005 each. The film layer 40 may include a polyester, polyethylene, polypropylene, nylon, acetate, polyvinyl chloride, polystyrene or any other material which provides a smooth adhesion surface for the pressure sensitive adhesive 36 of the tape body 22. Affixed to the underside of the film layer 40 is a pressure sensitive adhesive 42. This adhesive 42 may be an acrylic, vinyl acetate copolymer, or a natural or synthetic rubber based adhesive. As an alternative to the pressure sensitive adhesive, a heat actuatable or solvent actuatable adhesive may be used including ethylene vinyl acetate, resinitized polymers, phenolic, urethane, neoprene or polyamide. A release liner 44 is used to protect the adhesive surface 42 prior to application to the tape body 22.

Referring now to FIG. 4, the construction of the tape 20 of the present invention allows the assembly of custom length butt strip tape segments 20 for application to the insulation 12. This can be accomplished at the building site providing flexibility and a cost savings to the contractor. Alternatively, the tape 20 may be marketed in predetermined lengths by assembling the tape 20 upon manufacture. At the building site, a selected length of the tape body 22 sufficient to wrap around the insulation 12 is removed from a bulk roll. A segment of the plastic polymer film 24 is also selected. The release liner 44 is removed from the plastic film tape 24 and the film 24 is manually or mechanically applied across the first end 26 of the tape body 22. Upon installation of the insulation jackets 12, the release liner 38 is removed from the tape 20 and the tape 20 is applied to the insulation 12 spanning the seam 18 substantially as shown in FIG. 1. The first end 26 of the tape 20 is applied first and the tape 20 is wrapped around the circumference of the insulation 12 until the second end 28 overlaps the first end 26. The second end 28 is affixed on top of the first end 26, in particular, the plastic film 24 ensuring a secure attachment of the tape 20 to the insulation 12 to seal the gap 18. Since the film 24 provides a smooth adherence surface for the pressure sensitive adhesive 36 of the tape 20, the bond of the tape 20 to the insulation is greatly improved.

The foregoing detailed description has been given for clearness of understanding only and no unnecessary limitations should be understood therefrom as some modifications will be obvious to those skilled in the art without departing from the scope and spirit of the appended claims.

What is claimed is:

1. A butt strip sealing tape construction for sealing a seam between abutting portions of insulation comprising:

a multilayer butt strip tape body constructed of a kraft paper outer surface layer adhered to a metal foil inner surface layer using a fiberglass reinforced inner surface layer, said tape body having a first end and a second end, said tape body formed of sufficient length to cover the seam between the insulation portions and to overlap said second end of said second end of said tape body onto said first end of said tape body upon placement of said tape on the insulation, said tape body outer surface extending from said first end to said second end and a layer of pressure sensitive adhesive completely covering said inner surface of said tape body; and a bond enhancing plasitc polymer film is adhesively mounted to said outer surface proximate only said first end of said tape body to maintain exposure of a majority of said outer surface along said tape body, said film forming an adhesion surface at said first end of said tape body for said pressure sensitive adhesive of said second end of said tape body, said bond enhancing film proximate said first end of said tape body providing adhesion of said first end to said second end while maintaining separation of said pressure sensitive adhesive from said outer surface along said film upon overlap of said second end onto said first end thereby sealing the seam of insulation.

2. The tape construction as defined in claim 1 wherein said layer of plastic film is selected from the group consisting of polyester, polyethylene, polypropylene, nylon, acetate, polyvinyl chloride and polystyrene.

3. The tape construction as defined in claim 1 wherein said layer of plastic film has a thickness of between 0.0001 inch and 0.005 inch.

4. The tape construction as defined in claim 1 wherein said bond-enhancing film includes a release liner mounted to said pressure sensitive adhesive to protect said adhesive layer until application of said bond-enhancing film to said tape body.

5. The tape construction as defined in claim 4 wherein said bond-enhancing film is applied to said tape body upon determining the sufficient length of said tape body to cover the seam.

6. A butt strip sealing tape construction for sealing a seam between abutting portions of cylindrical segments of insulation, the insulation segments having a predetermined circumference, said tape construction comprising:

a multilayer butt strip tape body constructed of a draft paper outer surface layer adhered to a metal foil inner surface layer using a fiberglass reinforced inner surface layer, said tape body having a first end and a second end, said tape body having a length sufficient to extend around the circumference of the insulation along the seam and overlap said second end of said tape body onto said first end of said tape body, said tape body outer surface extending from said first end to said second end and a layer of pressure-sensitive adhesive completely covering said inner surface of said tape body; and a bond-enhancing plastic polymer film is adhesively mounted to said outer surface proximate only said first end of said tape body overlapped by said second end to prevent direct contact of said pressure sensitive adhesive of said second end of said tape body to the outer surface of said tape body beneath said film thereby forming an adhesion surface for said pressure sensitive adhesive of said second end of said tape body upon overlap of said second end onto said first end thereby sealing the seam of the insulation segments, said bond-enhancing film covering said outer surface proximate said first end to form said adhesion surface for said second end of said tape body.

7. The tape construction as defined in claim 6 where said layer of plastic film is selected from the group consisting of polyester, polyethylene, polypropylene, nylon, acetate, polyvinyl chloride and polystyrene.

8. The tape construction as defined in claim 7 wherein said layer of plastic film has a thickness of between 0.0001 inch and 0.005 inch.

9. The tape construction as defined in claim 8 wherein said bond-enhancing film includes a release liner mounted to said pressure sensitive adhesive to protect said adhesive layer until application of said bond-enhancing film to said tape body.

* * * * *